(12) United States Patent
Takeuchi et al.

(10) Patent No.: US 11,158,906 B2
(45) Date of Patent: Oct. 26, 2021

(54) LDH SEPARATOR AND ZINC SECONDARY BATTERY

(71) Applicant: NGK INSULATORS, LTD., Nagoya (JP)

(72) Inventors: Yukihisa Takeuchi, Nagoya (JP); Naohito Yamada, Nagoya (JP); Sota Okochi, Nagoya (JP); Shohei Yokoyama, Nagoya (JP); Naoko Inukai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/903,764

(22) Filed: Jun. 17, 2020

(65) Prior Publication Data

US 2020/0313134 A1     Oct. 1, 2020

Related U.S. Application Data

(63) Continuation of application No. PCT/JP2018/045889, filed on Dec. 13, 2018.

(30) Foreign Application Priority Data

Dec. 18, 2017  (JP) .............. JP2017-241988
Jun. 15, 2018  (JP) .............. JP2018-114672

(51) Int. Cl.
*H01M 50/446*     (2021.01)
*H01M 10/36*      (2010.01)
*H01M 8/0239*     (2016.01)

(52) U.S. Cl.
CPC ....... *H01M 50/446* (2021.01); *H01M 8/0239* (2013.01); *H01M 10/365* (2013.01)

(58) Field of Classification Search
CPC .. H01M 50/446; H01M 8/0289; H01M 10/24; H01M 12/08; H01M 50/403
See application file for complete search history.

(56) References Cited

U.S. PATENT DOCUMENTS

| | | |
|---|---|---|
| 9,293,791 B2 | 3/2016 | Yamada et al. |
| 9,793,529 B2 | 10/2017 | Fujisaki et al. |
| 10,290,847 B2 | 5/2019 | Kitoh et al. |
| 10,297,861 B2 | 5/2019 | Yonehara et al. |
| 2017/0214019 A1 | 7/2017 | Yokoyama et al. |
| 2017/0229697 A1* | 8/2017 | Hayashi ............ H01M 50/431 |

(Continued)

FOREIGN PATENT DOCUMENTS

| | | |
|---|---|---|
| JP | 2013-191523 A1 | 9/2013 |
| JP | 2016-071948 A1 | 5/2016 |
| WO | 2013/118561 A1 | 8/2013 |

(Continued)

OTHER PUBLICATIONS

International Search Report and Written Opinion (Application No. PCT/JP2018/045889) dated Mar. 5, 2019 (with English translation).

*Primary Examiner* — Stewart A Fraser
(74) *Attorney, Agent, or Firm* — Burr & Brown, PLLC (57) ABSTRACT

Provided is a layered double hydroxide (LDH) separator comprising a porous substrate made of a polymeric material; and a LDH with which pores of the porous substrate are plugged. A central region along the thickness of the LDH separator has a lower mean porosity than peripheral regions along the thickness of the LDH separator.

10 Claims, 4 Drawing Sheets

(56) References Cited

U.S. PATENT DOCUMENTS

2018/0248165 A1\* 8/2018 Gonda ............... H01M 10/288

FOREIGN PATENT DOCUMENTS

| WO | 2014/002756 | A1 | 1/2014 |
| WO | 2014/119665 | A1 | 8/2014 |
| WO | 2015/098612 | A1 | 7/2015 |
| WO | 2016/067884 | A1 | 5/2016 |
| WO | 2016/076047 | A1 | 5/2016 |

\* cited by examiner

LDH SEPARATOR AND ZINC SECONDARY BATTERY

CROSS-REFERENCE TO RELATED APPLICATIONS

This application is a continuation application of PCT/JP2018/045889 filed Dec. 13, 2018, which claims priority to Japanese Patent Application No. 2017-241988 filed Dec. 18, 2017 and Japanese Patent Application No. 2018-114672 filed Jun. 15, 2018, the entire contents all of which are incorporated herein by reference.

BACKGROUND OF THE INVENTION

1. Field of the Invention

The present invention relates to a LDH separator and a secondary zinc battery.

2. Description of the Related Art

In secondary zinc batteries, such as secondary nickel-zinc batteries and secondary air-zinc batteries, it is known that metallic zinc dendrites precipitate on negative electrodes during a charge mode, penetrate through voids in separators composed of, for example, non-woven fabrics, and reach positive electrodes, resulting in short circuit. The short circuit caused by such zinc dendrites occurs during repeated charge/discharge operations, leading to a reduction in service lives of the secondary zinc batteries.

In order to solve such a problem, secondary zinc batteries have been proposed that include layered double hydroxide (LDH) separators that selectively permeate hydroxide ions while blocking the penetration of zinc dendrites. For example, PTL 1 (WO2013/118561) discloses a secondary nickel-zinc battery including a LDH separator disposed between a positive electrode and a negative electrode. PTL 2 (WO2016/076047) discloses a separator structure including a LDH separator that is fit in or joined to a resin frame and is dense enough to restrict permeation of gas and/or water. PTL 2 also discloses that the LDH separator may be a composite with a porous substrate. In addition, PTL 3 (WO 2016/067884) discloses various methods for forming a dense LDH membrane on the surface of a porous substrate to give a composite material (a LDH separator). These methods include the steps of: uniformly bonding an initiating material capable of giving origins of crystal growth of LDH to the porous substrate; and then subjecting the porous substrate to hydrothermal treatment in an aqueous raw material solution to form a dense LDH membrane on the surface of the porous substrate.

CITATION LIST

Patent Literature

PTL1: WO2013/118561
PTL2: WO2016/076047
PTL3: WO2016/067884

SUMMARY OF THE INVENTION

In the case that secondary zinc batteries, for example, nickel-zinc batteries, are constructed with a LDH separator as described above, the problem such as short circuit caused by zinc dendrites can be effectively prevented to some extent. However, a further improvement is desired for a preventive effect of the short circuit caused by the dendrites.

The present inventors have discovered that by plugging pores of a porous polymeric substrate with LDH such that a central region along the thickness of the substrate has a lower mean porosity than peripheral regions along the thickness of the substrate, it is possible to provide a LDH separator that can more effectively prevent short circuiting caused by zinc dendrites.

Accordingly, an object of the present invention is to provide a LDH separator capable of more effectively restraining the short circuit caused by zinc dendrites.

According to an embodiment of the present invention, there is provided a layered double hydroxide (LDH) separator comprising a porous substrate made of a polymeric material; and a LDH with which pores of the porous substrate are plugged, wherein a central region along the thickness of the LDH separator has a lower mean porosity than peripheral regions along the thickness of the LDH separator.

According to another embodiment of the present invention, there is provided a secondary zinc battery comprising the LDH separator.

According to another embodiment of the present invention, there is provided a solid-state alkaline fuel cell comprising the LDH separator.

DETAILED DESCRIPTION OF THE INVENTION

LDH Separator

Figure 1:
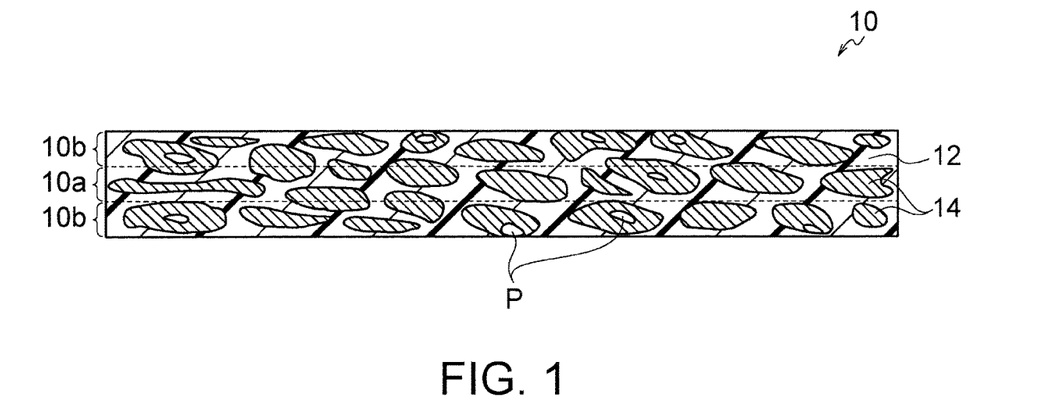
FIG. 1 is a conceptual schematic cross-sectional view illustrating a LDH separator of the present invention.

As illustrated in a schematic cross-sectional view in FIG. 1, a LDH separator 10 of the present invention includes a porous substrate 12 and a layered double hydroxide (LDH). Throughout the specification, "LDH separator" is defined as a separator that includes a LDH and can selectively permit hydroxide ions to migrate solely by means of hydroxide ion conductivity of the LDH. Although individual regions of the LDH 14 are seemed to be discontinuous between the top face and bottom face of the LDH separator 10 in a two-dimensional cross-section of the LDH separator in FIG. 1, the regions of the LDH 14 are continuous in the three-dimensional geometry including the depth between the top face and bottom face of the LDH separator 10, which ensures the hydroxide ion conductivity of the LDH separator 10. The porous substrate 12 is made of a polymeric material. Pores of the porous substrate 12 are plugged with the LDH 14. In this regard, the pores of the porous substrate 12 are not completely plugged with the LDH 14 and pores P that are not plugged with the LDH remain. From the viewpoint of such remaining pores P, the LDH separator 10 can be evaluated by a mean porosity. A central region 10a along the thickness of the LDH separator 10 has a lower mean porosity than peripheral regions 10b along the thickness of the LDH separator 10. In other words, the LDH separator 10 of the present invention has an uneven distribution of remaining pores P along the thickness. In detail, the central region 10a have high denseness whereas the peripheral regions 10b have low denseness. In this way, the pores of the porous polymeric substrate 12 are plugged with the LDH 14 such that the central region 10a along the thickness of the porous substrate 12 has a lower mean porosity than the peripheral regions 10b along the thickness of the porous substrate 12. The LDH separator 10 can be thereby provided that can more effectively prevent short circuiting caused by zinc dendrites. In a traditional separator, penetration of zinc dendrites is assumed to occur by the following mechanism: (i) Zinc dendrites intrude into voids or defects contained in the separator; (ii) the dendrites grow or propagate while expanding the voids or defects in the separator; and (iii) the dendrites finally penetrate the separator. In contrast, the LDH separator 10 of the present invention has the central region 10a with high denseness and the peripheral regions 10b with low denseness. Thus, the peripheral regions 10b having a higher mean porosity than the central region 10a can serve as buffer layers against the intrusion of the zinc dendrites and hold back the growth and propagation of the dendrites. As a result, the propagation of the zinc dendrites along the thickness of the LDH separator 10 (in particular, the penetration of the zinc dendrites through the central region 10a) can be significantly blocked. Thus, the short circuiting caused by the zinc dendrites can be more effectively prevented.

The LDH separator 10 of the present invention has excellent flexibility and strength, as well as a desired ion conductivity based on the hydroxide ion conductivity of the LDH 14. The flexibility and strength are caused by those of the porous polymeric substrate 12 itself of the LDH separator 10. In other words, the LDH separator 10 is densified in such a manner that the pores of the porous polymeric substrate 12 are sufficiently plugged with the LDH 14, and the porous polymeric substrate 12 and the LDH 14 are highly integrated into a superior composite material, thereby high rigidity and low ductility caused by the LDH 14, which is ceramic material, can be balanced with or reduced by high flexibility and high strength of the porous polymeric substrate 12.

As described above, the central region 10a along the thickness of the LDH separator 10 has a lower mean porosity than the peripheral regions 10b along the thickness of the LDH separator 10. In this specification, the central region 10a refers to the portion located in the center when the LDH separator 10 is divided into three equal portions in the direction of thickness, and the peripheral regions 10b refer to the portions close to the faces (i.e., the portions outside the central region 10a) when the LDH separator 10 is divided into three equal portions in the direction of thickness. It is preferred that the peripheral regions 10b have a mean porosity of 3% or more and that the central region 10a has a mean porosity of 2% or less. It is more preferred that the peripheral regions 10b have a mean porosity of 3 to 15% and that the central region 10a has a mean porosity of 1% or less. It is further preferred that the peripheral regions 10b have a mean porosity of 5 to 10% and that the central region 10a has a mean porosity of 0.01 to 1%. The central region 10a and the peripheral regions 10b having mean porosities in such ranges can more properly hold back the growth of the zinc dendrites in the peripheral regions 10b. Thus, the short circuiting caused by the zinc dendrites can be more effectively prevented. A significantly high ion conductivity of the LDH separator 10 can be also achieved. Thus, the LDH separator 10 can properly conduct hydroxide ions. The mean porosity can be determined by a) polishing a cross-sectional face of the LDH separator with a cross-sectional polisher (CP), b) capturing two fields of images of a functional layer at a magnification of 50,000 folds with a field-emission scanning electron microscope (FE-SEM), c) calculating porosities of the two fields with image inspection software (for example, HDevelop available from MVTec Software) based on the data of the captured cross-sectional images, and d) averaging the calculated porosities.

The LDH separator 10 has an ionic conductivity of preferably 0.1 mS/cm or more, more preferably 1.0 mS/cm or more, further preferably 1.5 mS/cm or more, particularly preferably 2.0 mS/cm or more. Such a range allows the LDH separator to fully function as a separator having hydroxide ionic conductivity. Since a higher ionic conductivity is preferred, the LDH separator may have any upper limit of ionic conductivity, for example, 10 mS/cm. The ionic conductivity is calculated from the resistance, the thickness and the area of the LDH separator. The resistance of the LDH separator 10 is measured within a frequency range of 1 MHz to 0.1 Hz and under an applied voltage of 10 mV using an electrochemical measurement system (potentio-galvanostat frequency responsive analyzer) for the LDH separator 10 immersed in an aqueous KOH solution of a predetermined concentration (for example, 5.4 M), and the intercept across the real axis can be determined to be the resistance of the LDH separator.

The LDH separator 10 includes a LDH 14, and can isolate a positive electrode plate from a negative electrode plate and ensures hydroxide ionic conductivity therebetween in a secondary zinc battery. The LDH separator 10 functions as a hydroxide ionic conductive separator. Preferred LDH separator 10 has gas-impermeability and/or water-impermeability. In other words, the LDH separator 10 is preferably densified to an extent that exhibits gas-impermeability and/or water-impermeability. The phrase "having gas-impermeability" throughout the specification indicates that no bubbling of helium gas is observed at one side of a sample when helium gas is brought into contact with the other side in water at a differential pressure of 0.5 atm as described in PTLs 2 and 3. In addition, the phrase "having water-impermeability" throughout the specification indicates that water in contact with one side of the sample does not permeate to the other side as described in PTLs 2 and 3. As a result, the LDH separator 10 having gas-impermeability and/or water-impermeability indicates having high density to an extent that no gas or no water permeates, and not being a porous membrane or any other porous material that has gas-permeability or water-permeability. Accordingly, the LDH separator 10 can selectively permeate only hydroxide ions due to its hydroxide ionic conductivity, and can serve as a battery separator. The LDH separator 10 thereby has a physical configuration that prevents penetration of zinc dendrites generated during a charge mode through the separator, resulting in prevention of short circuit between positive and negative electrodes. Since the LDH separator 10 has hydroxide ionic conductivity, the ionic conductivity allows a necessary amount of hydroxide ions to efficiently move between the positive electrode plate and the negative electrode plate, and thereby charge/discharge reaction can be achieved on the positive electrode plate and the negative electrode plate.

The LDH separator 10 preferably has a helium permeability per unit area of 3.0 cm/min·atm or less, more preferably 2.0 cm/min·atm or less, further preferably 1.0 cm/min·atm or less. A separator having a helium permeability of 3.0 cm/min·atm or less can remarkably restrain the permeation of Zn (typically, the permeation of zinc ions or zincate ions) in the electrolytic solution. Thus, it is conceivable in principle that the separator of the present embodiment can effectively restrain the growth of zinc dendrites when used in secondary zinc batteries because Zn permeation is significantly suppressed. The helium permeability is measured through the steps of: supplying helium gas to one side of the separator to allow the helium gas to permeate into the separator; and calculating the helium permeability to evaluate the density of the hydroxide ion conductive separator. The helium permeability is calculated from the expression of F/(P×S) where F is the volume of permeated helium gas per unit time, P is the differential pressure applied to the separator when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the separator has sufficiently high density suitable for separators of secondary zinc batteries can be evaluated readily, safely and effectively. The helium permeability can be preferably measured in accordance with the procedure shown in Evaluation 5 in Examples described later.

In the LDH separator 10 of the present invention, the pores in the porous substrate 12 are plugged with the LDH 14. As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH are composed of anions and $H_2O$. The anions are monovalent or multivalent anions, preferably monovalent or divalent ions. The anions in the LDH preferably include $OH^-$ and/or $CO_3^{2-}$. The LDH has high ionic conductivity based on its inherent properties.

In general, the LDH is known to typically have the fundamental formula: $M^{2+}_{1-x}M^{3+}_x(OH)_2A^{n-}_{x/n} \cdot mH_2O$ (wherein, $M^{2+}$ is a divalent cation, $M^{3+}$ is a trivalent cation, $A^{n-}$ is n-valent anion, n is an integer of 1 or more, x is 0.1 to 0.4, and m is 0 or more). In the above fundamental formula, $M^{2+}$ may be any divalent cation, and includes, preferably $Mg^{2+}$, $Ca^{2+}$ and $Zn^{2+}$, more preferably $Mg^{2+}$. $M^{3+}$ may be any trivalent cation, and includes, preferably $Al^{3+}$ and $Cr^{3+}$, more preferably $Al^{3+}$. $A^{n-}$ may be any anion, and preferably includes $OH^-$ and $CO_3^{2-}$. Accordingly, it is preferred that $M^{2+}$ includes $Mg^{2+}$, $M^{3+}$ includes $Al^{3+}$, and $A^{n-}$ includes $OH^-$ and/or $CO_3^{2-}$ in the above fundamental formula. n is an integer of 1 or more, preferably 1 or 2. x is 0.1 to 0.4, preferably 0.2 to 0.35. m is an any molar number of water, and is a real number of 0 or more, typically a real number of more than 0 or 1 or more. However, the above fundamental formula merely represents "a fundamental composition" typically illustrated for the LDH, and constituent ions can be appropriately replaced. For example, in the above fundamental formula, part or the whole of $M^{3+}$ may be replaced with a tetravalent or higher valence cation, where the coefficient x/n of the anion $A^{n-}$ may be appropriately varied in the above fundamental formula.

For example, the basic hydroxide layers of LDH may be composed of Ni, Ti, OH groups and optional incidental impurities. The intermediate layers of LDH are composed of anions and $H_2O$ as described above. Although the alternately stacked structure itself of basic hydroxide layers and intermediate layers is basically the same as the commonly known alternately stacked structure of LDH, the LDH of the embodiment, which is composed of the basic hydroxide layers mainly having Ni, Ti and OH groups of LDH, can exhibit high alkaline resistance. Although the reason is not clear, it is believed that no element (for example, Al) readily dissolved in an alkaline solution is intentionally added to the LDH of the embodiment. Nevertheless, the LDH of the embodiment can also exhibit high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Ti in the LDH can have the form of titanium ions. Although titanium ions in the LDH are typically believed to be $Ti^{4+}$, they may be present in any other valence, for example, $Ti^{3+}$. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni and Ti are not necessarily confirmed. Assuming that the basic hydroxide layers are mainly composed of $Ni^{2+}$, $Ti^{4+}$ and OH groups, the fundamental composition of the corresponding LDH can be represented by the general formula: $Ni^{2+}_{1-x}Ti^{4+}_x(OH)_2A^{n-}_{2x/n} \cdot mH_2O$, wherein $A^{n-}$ is an n-valent anion, n is an integer of 1 or more, preferably 1 or 2, x is above 0 to below 1, preferably 0.01 to 0.5, and m is a real number of 0 or more, typically a real number above 0 or 1 or more. However, it should be understood that the general formula indicates merely the "fundamental composition", and it may be replaced with other elements or ions (including elements with other valences of the same element, or elements or ions that may be unavoidably mixed in the manufacturing process) to such an extent that the elements such as $Ni^{2+}$, and $Ti^{4+}$ do not impair the basic properties of LDH.

Alternatively, the basic hydroxide layers of LDH comprise Ni, Al, Ti and OH groups. The intermediate layers are composed of anions and $H_2O$ as described above. Although the alternately stacked structure itself of basic hydroxide layers and intermediate layers is basically the same as the generally known alternately stacked structure of LDH, the LDH of the embodiment, in which the basic hydroxide layers of the LDH are composed of predetermined elements and/or ions including Ni, Al, Ti and OH groups, can exhibit high alkaline resistance. Although the reason is not clear, it is believed that Al, which has been considered to be readily dissolved in an alkaline solution, is hard to elute into the alkaline solution due to some interaction with Ni and Ti. Nevertheless, the LDH of the embodiment can also exhibit high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of aluminum ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions as long as they contain Ni, Al, Ti and OH groups. However, the basic hydroxide layers preferably contain Ni, Al, Ti and OH groups as main constituent elements. That is, it is preferred that the basic hydroxide layers are mainly composed of Ni, Al, Ti and OH groups. Accordingly, the basic hydroxide layers are typically composed of Ni, Al, Ti, OH groups and optional incidental impurities. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni, Al and Ti are not necessarily confirmed. Assuming that the basic hydroxide layers are mainly composed of $Ni^{2+}$, $Al^{3+}$, $Ti^{4+}$ and OH groups, the fundamental composition of the corresponding LDH can be represented by the general formula: $Ni^{2+}_{1-x-y}Al^{3+}_{x}Ti^{4+}_{y}(OH)_2 A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1 or more. However, it should be understood that the general formula indicates merely the "fundamental composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

As described above, the LDH separator 10 comprises the LDH 14 and the porous substrate 12 (typically consists of the porous substrate 12 and the LDH 14), and the LDH 14 plugs the pores in the porous substrate 12 such that the LDH separator 10 exhibits hydroxide ionic conductivity and gas-impermeability (thus, so as to serve as a LDH separator exhibiting hydroxide ionic conductivity). In particular, the LDH 14 is preferably incorporated over the entire thickness of the porous substrate 12 composed of a polymeric material. The LDH separator has a thickness of preferably 3 to 80 μm, more preferably 3 to 60 μm, further preferably 3 to 40 μm.

The porous substrate 12 is composed of a polymeric material. The polymeric porous substrate 12 has the following advantages; (1) high flexibility (hard to crack even if thinned), (2) high porosity, (3) high conductivity (small thickness with high porosity), and (4) good manufacturability and handling ability. The polymeric porous substrate has a further advantage; (5) readily folding and sealing the LDH separator including the porous substrate composed of the polymeric material based on the advantage (1): high flexibility. Preferred examples of the polymeric material include polystyrene, poly(ether sulfone), polypropylene, epoxy resin, poly(phenylene sulfide), fluorocarbon resin (tetra-fluorinated resin such as PTFE), cellulose, nylon, polyethylene and any combination thereof. More preferred examples include polystyrene, poly(ether sulfone), polypropylene, epoxy resin, poly(phenylene sulfide), fluorocarbon resin (tetra-fluorinated resin such as PTFE), nylon, polyethylene and any combination thereof from the viewpoint of a thermoplastic resin suitable for hot pressing. All the various preferred materials described above have alkali resistance to be resistant to the electrolytic solution of batteries. More preferred polymeric materials are polyolefins, such as polypropylene and polyethylene, most preferred are polypropylene and polyethylene from the viewpoint of excellent hot-water resistance, acid resistance and alkali resistance, and low material cost. In case that the porous substrate is composed of the polymeric material, the LDH is particularly preferably embedded over the entire thickness of the porous substrate (for example, most pores or substantially all pores inside the porous substrate are filled with the LDH). A polymeric microporous membrane commercially available can be preferably used as such a polymeric porous substrate.

Manufacturing Process

The LDH separator of the present invention is manufactured by the steps of: (i) preparing a LDH-containing composite material (i.e., a crude LDH separator) according to a known procedure using a polymeric porous substrate, and (ii) pressing the LDH-containing composite material. The step of pressing may be performed by any procedure, such as roll pressing, uniaxial pressure pressing, and CIP (cold isostatic pressing), preferably roll pressing. The step of pressing preferably involves heating to soften the porous polymeric substrate and thereby sufficiently plug the pores of the porous substrate with the LDH. For example, the heating temperature required for enough softening is preferably 60 to 200° C. in the case that the polymer in the substrate is polypropylene or polyethylene. The step of pressing, for example, roll pressing in such a temperature range can significantly reduce the mean porosity due to reductions in remaining pores of the LDH separator. As a result, the LDH separator can be significantly densified and thus more effectively prevent the short circuiting caused by zinc dendrites. Appropriate adjustments of the gap between rollers and the roller temperature in roll pressing can control the shapes of the remaining pores, resulting in a LDH separator having desired denseness or a desired mean porosity.

The LDH-containing composite material (i.e., the crude LDH separator) before the step of pressing can be produced by any process, preferably by appropriate modification of various conditions in known methods (e.g., see PTLs 1 to 3) for producing the functional layer and the LDH-containing composite material (that is, the LDH separator). For example, the LDH-containing functional layer and composite material (that is, the LDH separator) can be produced by the Steps of: (1) providing a porous substrate; (2) applying a titanium oxide sol or a mixed sol of titania and alumina onto the porous substrate and then heating the sol to form a titanium oxide layer or an alumina/titania layer; (3) immersing the porous substrate into an aqueous raw material solution containing nickel ions ($Ni^{2+}$) and urea; and (4) hydrothermally treating the porous substrate in the aqueous raw material solution to form the functional layer containing the LDH on the porous substrate and/or in a porous substrate. In particular, in Step (2), forming the titanium oxide layer or the alumina/titania layer on the porous substrate can not only produce a raw material for the LDH, but also serve as a seed for crystalline growth of the LDH and uniformly form the functional layer containing the LDH that is highly densified in the porous substrate. The heat treatment temperature (drying temperature) in Step (2) can be controlled for control of the distribution of pores along the thickness of the LDH separator, resulting in an uneven distribution of the pores along the thickness of the LDH separator. In detail, it is preferred to set the heat treatment temperature (drying temperature) in Step (2) to a low level of 80° C. or less (for example, 50 to 70° C.) for a reduction in the drying rate to achieve a pore distribution such that the central region along the thickness of the LDH separator has a lower mean porosity than the peripheral regions along the thickness of the LDH separator. A precursor of the LDH thereby diffuses to leak through the faces of the porous substrate. As a result, the peripheral regions have a lower denseness than the central region. In addition, in Step (3), the presence of urea raises the pH value by generation of ammonia in the solution through the hydrolysis of urea, and gives the LDH by formation of hydroxide with coexisting metal ions. Also, generation of carbon dioxide in hydrolysis gives the LDH of a carbonate anion type.

In particular, a composite material (that is, the LDH separator) in which the porous substrate is composed of a polymeric material and the functional layer is embedded over the porous substrate in the thickness direction is produced by applying the mixed sol of alumina and titania to the substrate in Step (2) in such that the mixed sol permeates into all or most area of the interior pores of the substrate. By this manner, most or substantially all pores inside the porous substrate can be embedded with the LDH. Examples of preferred application include dip coating and filtration coating. Particularly preferred is dip coating. The amount of the deposited mixed sol can be varied by adjusting the number of times of coating such as dip coating. The substrate coated with the mixed sol by, for example, dip coating may be dried and then subjected to Steps (3) and (4).

Secondary Zinc Batteries

The LDH separator of the present invention is preferably applied to secondary zinc batteries. According to a preferred embodiment of the present invention, a secondary zinc battery comprising the LDH separator are provided. A typical secondary zinc battery includes a positive electrode, a negative electrode, and an electrolytic solution, and isolates the positive electrode from the negative electrode with the LDH separator therebetween. The secondary zinc battery of the present invention may be of any type that includes a zinc negative electrode and an electrolytic solution (typically, an aqueous alkali metal hydroxide solution). Accordingly, examples of the secondary zinc battery include secondary nickel-zinc batteries, secondary silver oxide-zinc batteries, secondary manganese oxide-zinc batteries, secondary zinc-air batteries, and various other secondary alkaline zinc batteries. For example, the secondary zinc battery may preferably be a secondary nickel-zinc battery, the positive electrode of which contains nickel hydroxide and/or nickel oxyhydroxide. Alternatively, the secondary zinc battery may be a secondary zinc-air battery, the positive electrode of which is an air electrode.

Solid-State Alkaline Fuel Cells

The LDH separator of the present invention can be applied to a solid-state alkaline fuel cell. The use of the LDH separator that includes the porous polymeric substrate having the pores plugged with the LDH such that the central region along the thickness of the substrate has a lower mean porosity than the peripheral regions along the thickness of the substrate, it is possible to provide a solid-state alkaline fuel cell that can effectively prevent a reduction in electromotive force caused by permeation of a fuel (for example, by cross-over of methanol) into an air electrode: The hydroxide ion conductivity of the LDH separator can effectively prevent permeation of a fuel, for example, methanol through the LDH separator. Thus, another preferred embodiment of the present invention provides a solid-state alkaline fuel cell including the LDH separator. A typical solid-state alkaline fuel cell includes an air electrode receiving oxygen, a fuel electrode receiving a liquid fuel and/or a gaseous fuel, and the LDH separator interposed between the fuel electrode and the air electrode.

Other Batteries

The LDH separator of the present invention can be used not only in nickel-zinc batteries or solid-state alkaline fuel cells but also in, for example, nickel-hydrogen batteries. In this case, the LDH separator serves to block a nitride shuttle (movement of nitrate groups between electrodes), which is a factor of the self-discharging in the battery. The LDH separator of the present invention can also be applied in, for example, lithium batteries (batteries having a negative electrode composed of lithium metal), lithium ion batteries (batteries having a negative electrode composed of, for example, carbon), or lithium-air batteries.

EXAMPLES

The invention will be further described in more detail by the following Examples. The following procedures were used to evaluate the LDH separator produced in these Examples.

Evaluation 1: Identification of LDH Separator

The crystalline phase of the LDH separator was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO. 35-0964.

Evaluation 2: Measurement of Thickness

The thickness of each LDH separator was measured with a micrometer. The thickness was measured at three points on the LDH separator. The mean value was calculated from these measurements and defined as the thickness of the LDH separator.

Evaluation 3: Measurement of Mean Porosity

A cross-sectional face of each LDH separator was polished with a cross-sectional polisher (CP). Two fields of images of the cross-sectional face of the LDH separator were captured at a magnification of 50,000 folds with a FE-SEM (ULTRA55 available from Carl Zeiss). Based on the image data, the porosities of the two fields were calculated with image inspection software (HDevelop available from MVTec Software). The average of the porosities was defined as the mean porosity. The mean porosity was determined at the peripheral regions of the LDH separator (the regions at a depth of 1 to 4 μm from the faces of the LDH separator) and the central region of the LDH separator.

Evaluation 4: Continuous Charge Test

Figure 2:
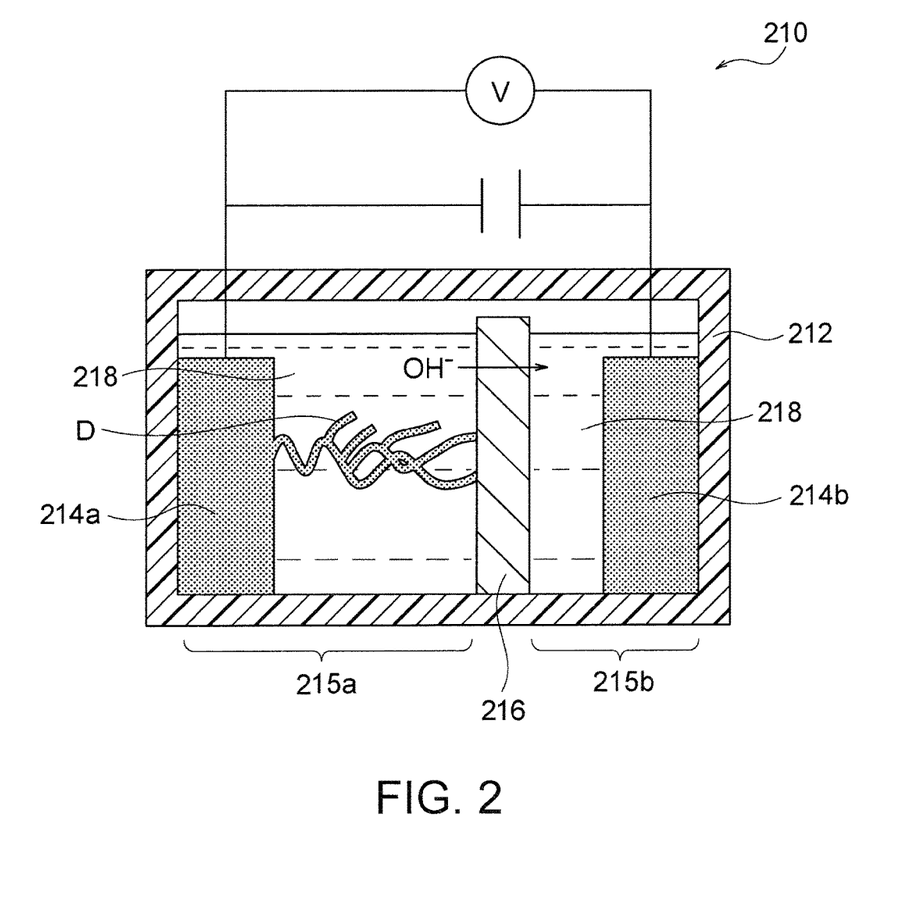
FIG. 2 is a schematic cross-sectional view of a measurement device used in the dendrite short-circuiting test in Examples 1 to 4.

A device 210 was assembled as shown in FIG. 2 and an accelerated test was carried out to continuously grow zinc dendrites. Specifically, a rectangular container 212 made of ABS resin was prepared, in which a zinc electrode 214a is separated by 0.5 cm from a copper electrode 214b to face each other. The zinc electrode 214a is a metal zinc plate, and the copper electrode 214b is a metal copper plate. In addition, a LDH separator structure including the LDH separator 216 was constructed, such that an epoxy resin-based adhesive was applied along the outer periphery of the LDH separator, and the LDH separator was bonded to a jig made of ABS resin having an opening at the center. At this time, the bonded area between the jig and the LDH separator was sufficiently sealed with the adhesive to ensure liquid-tightness. The LDH separator structure was then disposed in the container 212 to isolate a first section 215a including the zinc electrode 214a from a second section 215b including the copper electrode 214b, inhibiting liquid communication other than the area of the LDH separator 216. In this configuration, three outer edges of the LDH separator structure (or three outer edges of the jig made of ABS resin) were bonded to the inner wall of the container 212 with an epoxy resin adhesive to ensure liquid-tightness. In other words, the bonded area between the separator structure including the LDH separator 216 and the container 212 was sealed to inhibit the liquid communication. 5.4 mol/L aqueous KOH solution as an aqueous alkaline solution 218 was poured into the first section 215a and the second section 215b along with ZnO powders equivalent to saturated solubility. The zinc electrode 214a and the copper electrode 214b were connected to a negative terminal and a positive terminal of the constant-current power supply, respectively, and a voltmeter was also connected in parallel with the constant-current power supply. The liquid level of the aqueous alkaline solution 218 was determined below the height of the LDH separator structure (including the jig) such that the entire area of the LDH separator 216 in both the first section 215a and the second section 215b was immersed in the aqueous alkaline solution 218. In the measurement device 210 having such a configuration, a constant current of 20 mA/cm$^2$ was continuously applied between the zinc electrode 214a and the copper electrode 214b for up to 200 hours. During application of the constant current, the voltage between the zinc electrode 214a and the copper electrode 214b was monitored with a voltmeter to check for short circuit caused by zinc dendrites (a sharp voltage drop) between the zinc electrode 214a and the copper electrode 214b. No short circuit for over 100 hours (or over 200 hours) was determined as "(short circuit) not found", and short circuit within less than 100 hours (or less than 200 hours) was determined as "(short circuit) found".

Evaluation 5: Helium Permeability

A helium permeation test was conducted to evaluate the density of the LDH separator from the viewpoint of helium permeability. The helium permeability measurement system 310 shown in FIGS. 3A and 3B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of the LDH separator 318 held by the sample holder 316.

Figure 3A:
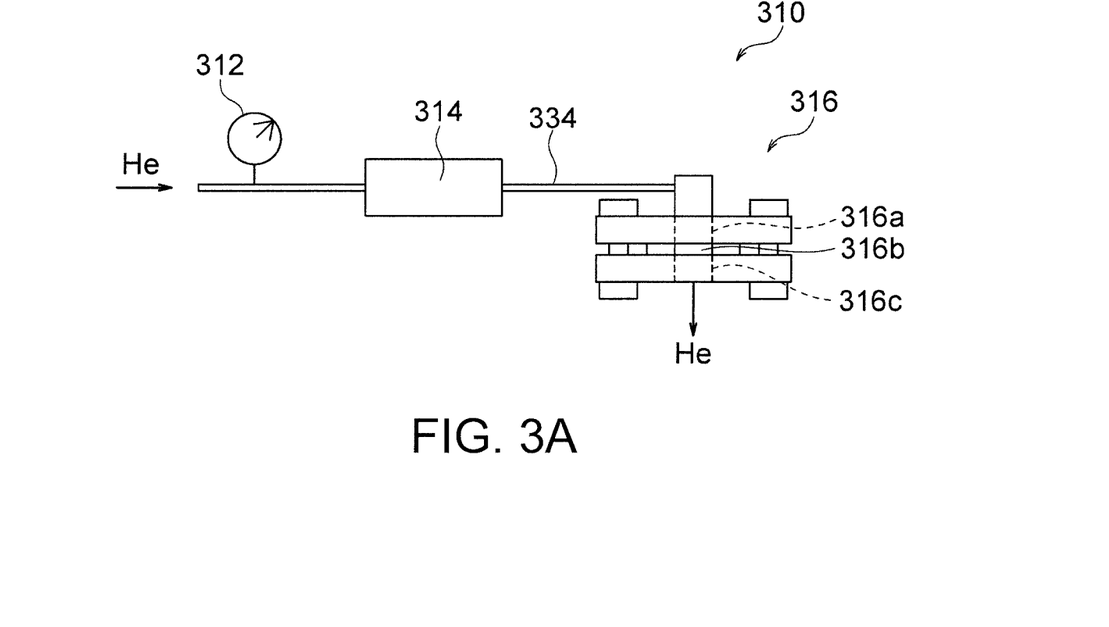
FIG. 3A is a conceptual view illustrating an example system for measuring helium permeability used in Examples 1 to 4.
Figure 3B:
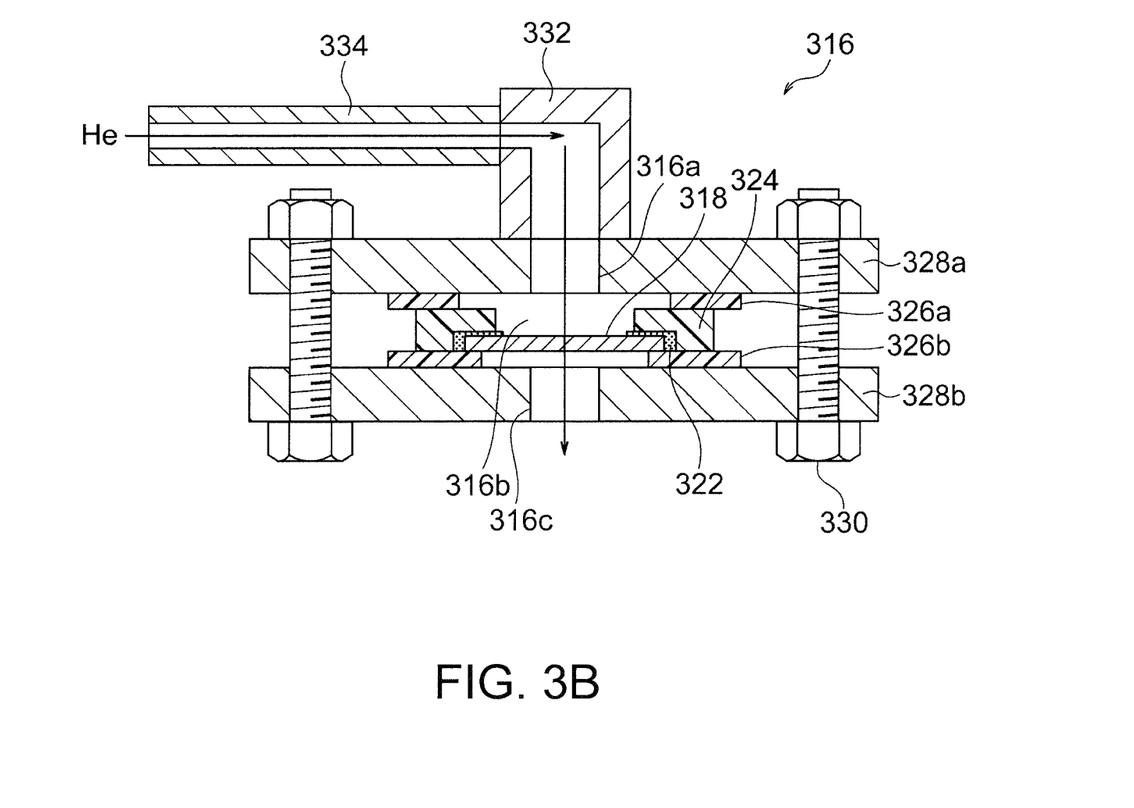
FIG. 3B is a schematic cross-sectional view of a sample holder and its peripheral configuration used in the measurement system shown in FIG. 3A.

The sample holder 316 had a structure including a gas supply port 316a, a sealed space 316b and a gas discharge port 316c, and was assembled as follows: An adhesive 322 was applied along the outer periphery of the LDH separator 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the LDH separator 318, the jig 324, the sealing member 326a, and the supporting member 328a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the LDH separator 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of F/(P×S) where F (cm$^3$/min) was the volume of permeated helium gas per unit time, P (atm) was the differential pressure applied to the LDH separator when helium gas permeated through, and S (cm$^2$) was the area of the membrane through which helium gas permeates. The permeation rate F (cm$^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm.

Evaluation 6: Measurement of Ionic Conductivity

Figure 4:
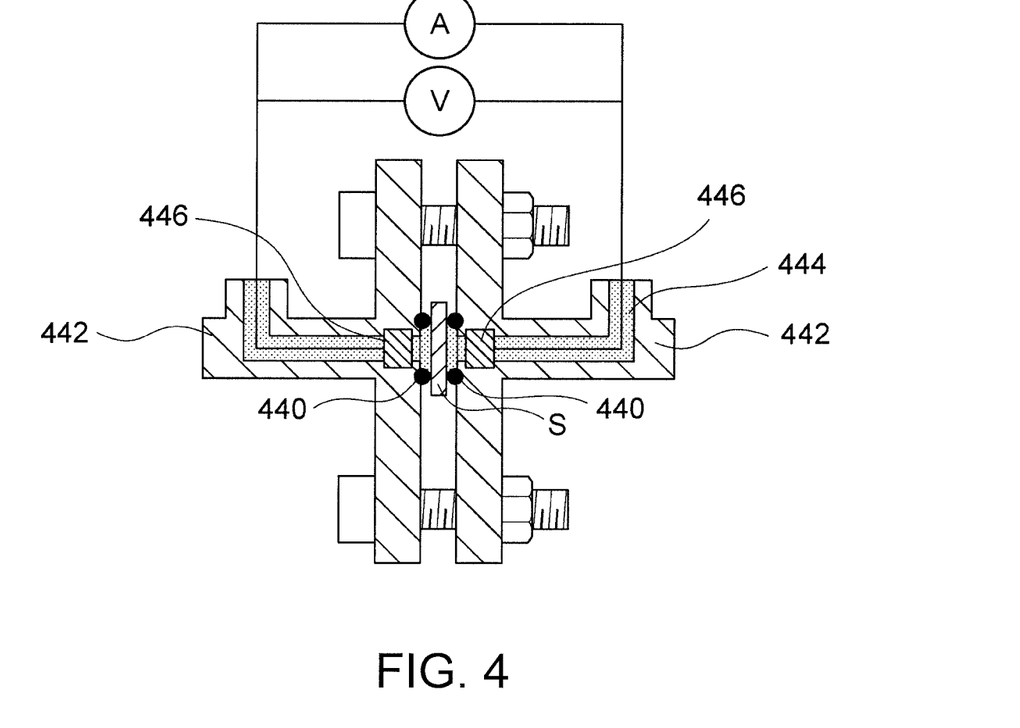
FIG. 4 is a schematic cross-sectional view illustrating an electrochemical measurement system used in Examples 1 to 4.

The ionic conductivity of the LDH separator in the electrolytic solution was measured with an electrochemical measurement system shown in FIG. 4. A LDH separator sample S was sandwiched between two silicone gaskets 440 having a thickness of 1 mm and assembled into a PTFE flange-type cell 442 having an inner diameter of 6 mm. Electrodes 446 made of #100 nickel wire mesh were formed into a cylindrical shape having a diameter of 6 mm, and assembled into the cell 442, and the distance between the electrodes was 2.2 mm. The cell 442 was filled with 5.4M aqueous KOH solution as an electrolytic solution 444. Using the electrochemical measurement system (potentio-galvanostat frequency responsive analyzers 1287A and 1255B, manufactured by Solartron), the sample was subjected to measurement under the conditions of a frequency range of 1 MHz to 0.1 Hz and an applied voltage of 10 mV, and the resistance of the LDH separator sample S was determined from the intercept across a real number axis. The conductivity was calculated with the resistance, the thickness, and the area of the LDH separator.

Example 1 (Comparative)

(1) Preparation of Polymeric Porous Substrate

A commercially available polyethylene microporous membrane having a porosity of 50%, a mean pore size of 0.1 μm and a thickness of 20 μm as a polymeric porous substrate was cut out into a size of 2.0 cm×2.0 cm.

(2) Coating of Alumina/Titania Sol on Polymeric Porous Substrate

An amorphous alumina solution (Al-ML15, manufactured by Taki Chemical Co., Ltd.) and a titanium oxide sol solution (M6, manufactured by Taki Chemical Co., Ltd.)

were mixed at Ti/Al molar ratio of 2 to yield a mixed sol. The mixed sol was allowed to permeate the substrate prepared in Process (1) by dip coating. In dip coating, the substrate was immersed in 100 mL of the mixed sol, pulled up vertically and dried in a dryer at 90° C. for five minutes.

(3) Preparation of Aqueous Raw Material Solution

Nickel nitrate hexahydrate ($Ni(NO_3)_2 \cdot 6H_2O$, manufactured by Kanto Chemical Co., Inc.), and urea (($NH_2)_2CO$, manufactured by Sigma-Aldrich Corporation) were provided as raw materials. Nickel nitrate hexahydrate was weighed to be 0.015 mol/L and placed in a beaker. Ion-exchanged water was added into a total volume of 75 mL. After stirring the solution, the urea weighed at a urea/$NO_3^-$ molar ratio of 16 was added, and further stirred to give an aqueous raw material solution.

(4) Formation of Membrane by Hydrothermal Treatment

The aqueous raw material solution and the dip-coated substrate were encapsulated into a Teflon™ autoclave (the internal volume: 100 mL, covered with stainless steel jacket). The substrate was horizontally fixed away from the bottom of the Teflon™ autoclave such that the solution was in contact with the two surfaces of the substrate. A LDH was then formed on the surface and the interior of the substrate by a hydrothermal treatment at a temperature of 120° C. for 24 hour. After a predetermined period, the substrate was removed from the autoclave, washed with ion-exchanged water, and dried at 70° C. for ten hours to form the LDH in the pores of porous substrate and give a LDH-containing composite material.

(5) Densification by Roll Pressing

The composite material containing the above LDH is sandwiched between a pair of PET films (Lumirror™ manufactured by Toray Industries, Inc., a thickness of 40 μm), and then roll-pressed at a rotation rate of 3 mm/s, at a roller temperature of 110° C., and with a gap between rollers of 60 μm to give a LDH separator.

(6) Results of Evaluation

The resultant LDH separator was evaluated in accordance with Evaluations 1 to 6. As a result of Evaluation 1, this LDH separator was identified as LDH (hydrotalcite compound). The results of Evaluations 2 to 6 are as shown in Table 1. As shown in Table 1, zinc dendrites did not cause short circuiting after continuous charge up to 100 hours, but caused short circuiting after continuous charge for less than 200 hours in Evaluation 4.

Examples 2 and 3

Figure 5A:
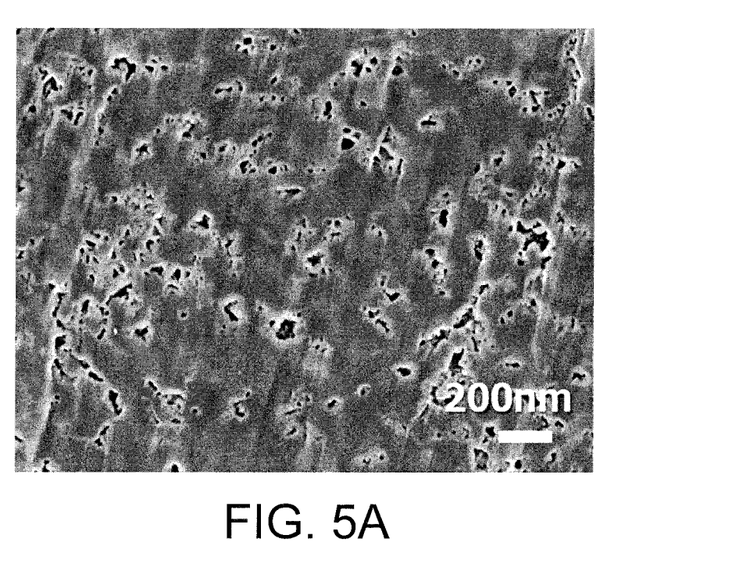
FIG. 5A is a cross-sectional field-emission scanning electron microscopic (FE-SEM) image of the peripheral region (the region at a depth of 1 to 4 μm from the face) of a LDH separator produced in Example 3. In the drawing, the gray areas correspond to the porous polymeric substrate, the white areas LDH, and the black areas remaining pores.
Figure 5B:
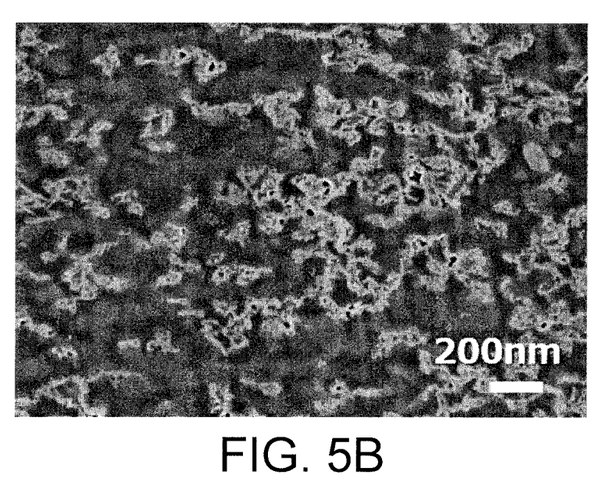
FIG. 5B is a cross-sectional FE-SEM image of the central region of the LDH separator produced in Example 3. In the drawing, the gray areas correspond to the porous polymeric substrate, the white areas the LDH, and the black areas remaining pores.

Each LDH separator was produced and evaluated as in Example 1 except that the drying temperature after the immersion with alumina/titania sol was varied to the values shown in Table 1 in Process (2). As a result of Evaluation 1, the LDH separators in these Examples were identified as LDH (hydrotalcite compound). Table 1 shows the results of Evaluations 2 to 6. As shown in Table 1, zinc dendrites did not cause short circuiting even after continuous charge for 200 hours or more in Examples 2 and 3. FIGS. 5A and 5B respectively show cross-sectional FE-SEM images, captured in Evaluation 3, of the peripheral region and the central region of the LDH separator according to Example 3.

Example 4 (Comparative)

The LDH separator was produced and evaluated as in Example 1 except that the densification by roll pressing in Process (5) was not carried out. The results of Evaluation 1 indicated that the LDH separator of this Example was identified as LDH (hydrotalcite compound). Table 1 shows the results of Evaluations 2 to 6. As shown in Table 1, zinc dendrites caused short circuiting after continuous charge for less than 100 hours in Evaluation 4.

Examples 5 and 6

A LDH separator was produced and evaluated as in Example 1 except for the following conditions a) to c).
a) The drying temperature after the immersion with alumina/titania sol was varied to the values shown in Table 1 in Process (2).
b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, the urea weighed at a urea/$NO_3^-$ molar ratio of 8 was added, and further stirred to give an aqueous raw material solution.
c) The hydrothermal temperature in Process (4) was 90° C.

As a result of Evaluation 1, this LDH separator was identified as LDH (hydrotalcite compound). The results of Evaluations 2 to 6 are shown in Table 1. As shown in Table 1, zinc dendrites did not cause short circuiting even after continuous charge for 200 hours or more in Examples 5 and 6.

TABLE 1

| | | Production Conditions | | | Mean porosity (%) | | | | Continuous charge test | |
|---|---|---|---|---|---|---|---|---|---|---|
| | Composition of LDH separator | Drying temperature after immersion with alumina/titania sol (° C.) | Roll Temp. (° C.) | Thickness (μm) | peripheral region (the region at a depth of 1 to 4 μm from the face) | Central region | Helium permeability (cm/min · atm) | Ion conductivity (mS/cm) | Short circuiting over continuous charging time up to 100 hours | Short circuiting over continuous charging time up to 200 hours |
| Ex. 1* | Ni—Al, Ti | 90 | 110 | 13 | 1 | 1 | 0.0 | 3.0 | None | Found |
| Ex. 2 | Ni—Al, Ti | 70 | 110 | 13 | 5 | 1 | 0.0 | 3.0 | None | None |
| Ex. 3 | Ni—Al, Ti | 50 | 110 | 13 | 10 | 1 | 0.0 | 3.1 | None | None |

TABLE 1-continued

| | | Production Conditions | | | Evaluations of LDH separator | | | | | |
| | | | | | | Mean porosity (%) | | | | Continuous charge test | |
| | Composition of LDH separator | Drying temperature after immersion with alumina/titania sol (° C.) | Roll Temp. (° C.) | Thickness (μm) | peripheral region (the region at a depth of 1 to 4 μm from the face) | Central region | Helium permeability (cm/min · atm) | Ion conductivity (mS/cm) | Short circuiting over continuous charging time up to 100 hours | Short circuiting over continuous charging time up to 200 hours |
|---|---|---|---|---|---|---|---|---|---|---|
| Ex. 4* | Ni—Al, Ti | 90 | — | 16 | 20 | 20 | 100 | 3.2 | Found | — |
| Ex. 5 | Mg—Al, Ti | 70 | 110 | 13 | 6 | 1 | 0.0 | 3.0 | None | None |
| Ex. 6 | Mg—Al, Ti | 50 | 110 | 14 | 12 | 1 | 0.0 | 3.1 | None | None |

*indicates Comparative Example.

What is claimed is:

1. A layered double hydroxide (LDH) separator comprising a porous substrate made of a polymeric material; and a LDH with which pores of the porous substrate are plugged,
   wherein a central region along the thickness of the LDH separator has a lower mean porosity than peripheral regions along the thickness of the LDH separator.

2. The LDH separator according to claim 1, wherein the peripheral regions have a mean porosity of 3% or more and the central region has a mean porosity of 2% or less.

3. The LDH separator according to claim 1, wherein the peripheral regions have a mean porosity of 3 to 15% and the central region has a mean porosity of 1% or less.

4. The LDH separator according to claim 1, wherein the LDH is incorporated over the entire thickness of the porous substrate.

5. The LDH separator according to claim 1, having a helium permeability per unit area of 3.0 cm/atm·min or less.

6. The LDH separator according to claim 1, having an ionic conductivity of 2.0 mS/cm or more.

7. The LDH separator according to claim 1, wherein the polymeric material is selected from the group consisting of polystyrene, poly(ether sulfone), polypropylene, epoxy resin, poly(phenylene sulfide), fluorocarbon resin, cellulose, nylon, and polyethylene.

8. The LDH separator according to claim 1, consisting of the porous substrate and the LDH.

9. A secondary zinc battery comprising the LDH separator according to claim 1.

10. A solid-state alkaline fuel cell comprising the LDH separator according to claim 1.

* * * * *